Dec. 26, 1967  N. F. GUICHET  3,359,639
DENTAL ARTICULATORS AND CLUTCH FABRICATION
Filed Aug. 10, 1964  3 Sheets-Sheet 1

INVENTOR
Niles F. Guichet
BY
ATTORNEY

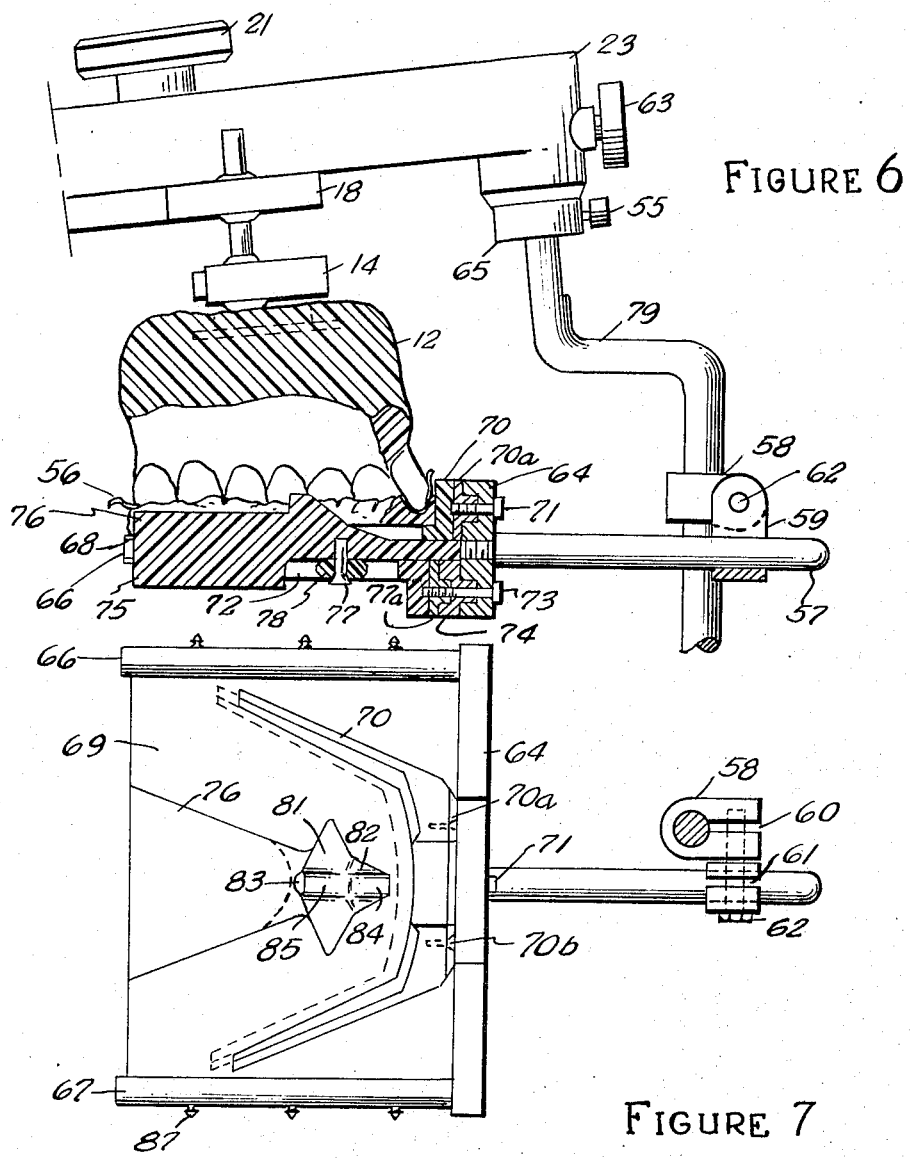

Dec. 26, 1967  N. F. GUICHET  3,359,639
DENTAL ARTICULATORS AND CLUTCH FABRICATION
Filed Aug. 10, 1964  3 Sheets-Sheet 3

INVENTOR.
Niles F. Guichet
BY
ATTORNEY 3,359,639
DENTAL ARTICULATORS AND CLUTCH
FABRICATION
Niles F. Guichet, 320 Olympia Place,
Anaheim, Calif. 92805
Filed Aug. 10, 1964, Ser. No. 389,240
6 Claims. (Cl. 32—32)

This invention relates to an improved method and means for mounting of casts in a dental articulator and to a mounting jig for the fabrication of dental clutches in a dental articulator. This invention also relates to improvements in dental clutches and their fabrication.

Casts, i.e., models of patients' teeth, are conventionally secured to mounting rings on the articulator by plaster. While the mounting rings are detachable, their position in the articulator is fixed so that after the plaster has hardened, the spacial position of the casts can not thereafter be adjusted.

The dental clutches are conventionally fabricated from the casts after the latter have been mounted in the articulator. These clutches, which comprise negative impressions of the teeth cast on a support fork, are used to support dental equipment such as a face bow or tracing device on the patient when recording the patient's jaw movements. Conventionally, a dished bearing plate is centrally molded in the upper clutch to rest on a bearing pin located beneath it in the lower clutch. In fabrication of the clutches, a sheet of plastic film or metal foil is placed around the models and the upper and lower clutch forks, the upper bearing plate and the lower pin support are held between the models. The articulator is closed to centric and, then, while steadying the aforementioned clutch parts by hand, a cold curing plastic is poured around the models to cast on intaglio mold thereof in which the clutch forks and bearing surfaces are embedded.

The manual fabrication of clutches requires a high degree of manual dexterity and time to properly position all the clutch parts, i.e., the upper and lower work, the bearing pin support and the upper bearing plate, and to maintain the position of these parts during casting of the clutches. Additionally, the conventional dished bearing plate used in the upper clutch readily encourages an undesired protrusion of the patient's jaw when recordings of the lateral excursions are made, thereby making it difficult to secure a pure lateral excursion.

It is an object of this invention to provide an improved method and means for mounting casts in a dental articulator.

It is also an object of this invention to provide an improved method and means for the fabrication of dental clutches.

It is an additional object of this invention to provide cast mounting means in a dental articulator which reduce the time for mounting of casts therein.

It is a further object of this invention to provide a mounting jig for the fabrication of dental clutches in a dental articulator.

It is also an object of this invention to provide a jig for the fabrication of dental clutches that can be used directly for the fabrication of dental clutches in the patient's mouth.

It is also an object of this invention to provide an improved dental clutch having a bearing surface that discourages protrusive movement during lateral excursion of a patient's jaw.

Other and related objects will be apparent from the following description of the invention.

My invention will now be described by reference to the figures, of which:

FIGURE 6 illustrates a portion of the articulator having my clutch fabrication jig attached thereto;

FIGURE 7 illustrates a plan view of the jig shown in FIGURE 6;

Figure 1:
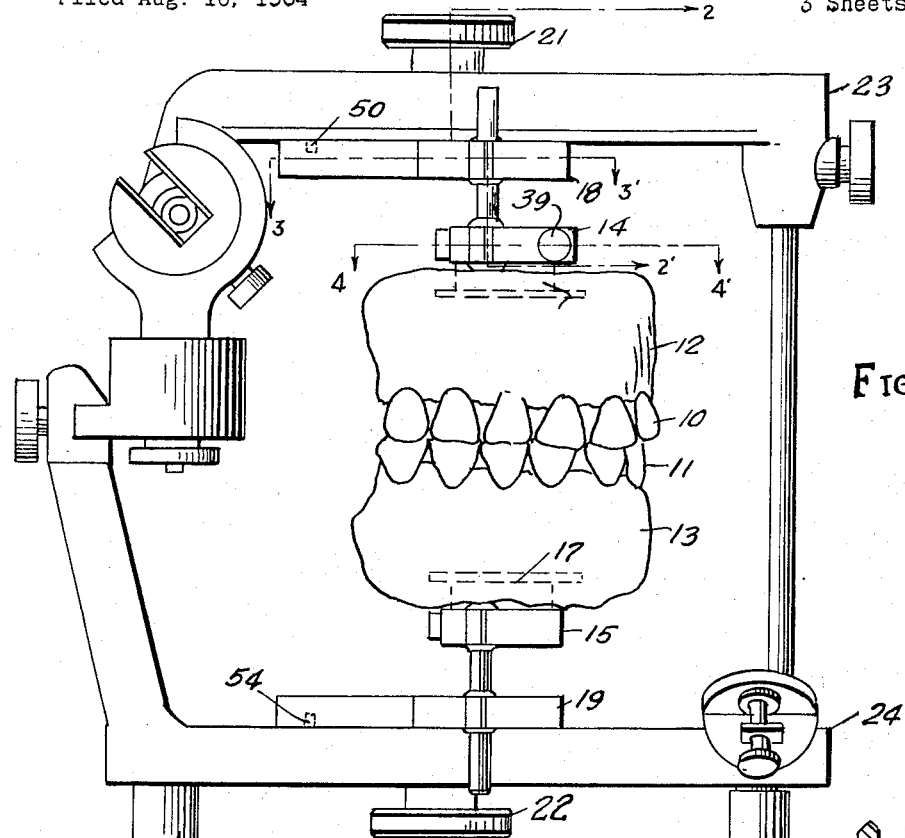
FIGURE 1 illustrates a dental articulator having casts mounted therein with my improved mounting means which permit adjustment of the spacial position of the casts.

Referring now to FIGURE 1, models 10 and 11 of the patient's teeth are shown in plaster casts 12 and 13 which are removably attached to the cast supports 14 and 15. While my invention is illustrated with the improved mounting means on both the upper and lower casts, it is of course apparent that one of the casts could be secured in the conventional manner on a removable cast mounting ring. The casts are attached to the cast supports by connectors 16 and 17 which are molded in the cast in a manner hereafter described in regard to FIGURE 5. The cast supports 14 and 15 are attached to the frame members of the articulator by means that permit the universal movement of the casts, i.e., that permits free lateral, longitudinal and vertical movement of the casts as well as free variation in the horizontal inclination and in the angular position of the casts about their mounting axis. As shown in FIGURE 1, this attachment comprises plates 18 and 19 adjacent the cast supports and attached to the frame members of the articulator.

Figure 2:
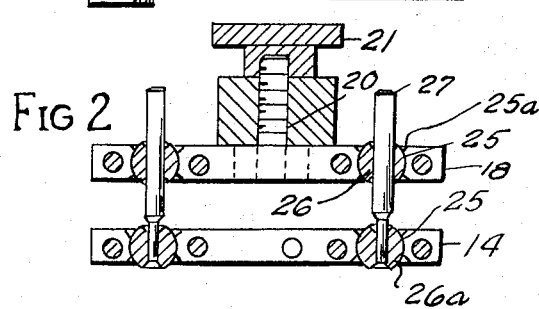
FIGURE 2 illustrates a view of the mounting means along line 2–2' of FIGURE 1.

These plates are attached to a conventional articulator by studs such as 20; see FIGURE 2; which are locked to the frame member of the articulator by hand wheels 21 and 22. The studs fit into either of two taps in the plates 18 and 19; these taps are shown as 52 and 53 in FIGURE 3. To provide an indexing guide which will permit repeated mounting and dismounting of the casts, a guide 50 is provided on the frame member and this guide fits into the groove or yoke 51 of the mounting block. A similar guide 54 is placed on the lower member of the articulator.

At each end of the plates and cast supports there are positioned sockets which have a concave inner surface; preferably of a generally spherical shape. These sockets are shown in FIGURE 2 as elements 25. A generally spherical split bearing such as 26 is placed in each of the sockets. A rod or tube such as 27 is mounted in the central bore through each of the bearings. The tubes 27 freely slide in the bearings in plates 18 and 19; however in the preferred embodiment, the base of the tubes is firmly attached to the bearings in the cast supports 14 and 15 by suitable means such as a slip fit, solder, etc. Preferably, the spherical bearings 26a in the sockets of the cast supports 14 and 15 are not split. In this manner, accidental discharge of the tubes from the assembly is prevented. To permit a wide variation in movement, the outer periphery of the sockets is preferably beveled as shown by 25a. It is apparent from the preceding that the cast support readily permits free movement of the casts in all possible directions and permits variation in the horizontal inclination and in the angular position of the casts since the tubes are free to slide in the split bearings 26 and all the bearings are free to rotate, roll and pitch in their sockets.

Figure 3:
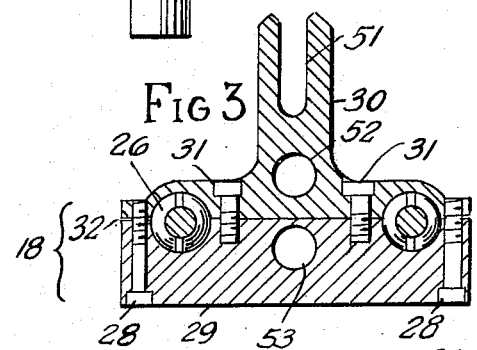
FIGURE 3 illustrates a view of the mounting means along line 3–3' of FIGURE 1.
Figure 4:
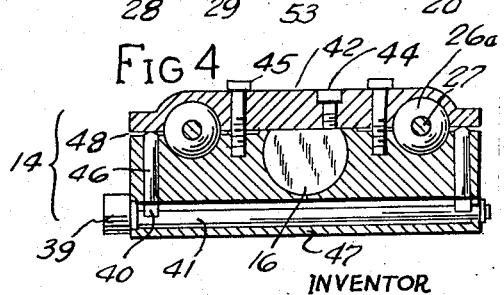
FIGURE 4 illustrates a view of the mounting means along line 4–4' of FIGURE 1.

When the casts are properly oriented in the articulator, the cast supports are locked by screws such as 28. The locking means is best shown in FIGURE 3 illustrating a cross section of the upper plate 18. FIGURE 4 illustrates a cross-section of the cast support 14 wherein an alternative locking means is employed. The lower plate 19 and cast support 15 are identical in construction and employ locking screws such as 28 shown in FIGURE 3.

Referring now to FIGURE 3, the plates are formed from two blocks, 29 and 30, which are assembled together by machine screws 31. Screws 28 are placed in a bore at each outboard end of block 29 and engage threaded taps in block 30. The outer edges of blocks 29 and 30 are gapped apart about 0.002 to 0.01 inch as shown by 32 to permit screws 28 to compress the sockets 25 against the split bearings 26. After the casts have been oriented to the proper position, screws 28 are tightened to compress gap 32 and bind the split bearings 26 in their sockets 25, thereby locking the bearings against further movement. The bearings in plates 18 and 19 are split so that compression of the bearings in their sockets is transmitted to the tubes 27 which are mounted in the bearings. In this manner the cast support is locked against all movement.

Referring now to FIGURE 4, the cast support 14 also comprises two blocks, 46 and 47 that are assembled together by machine screws 45. Bearings 26a are preferably solid with a central bore to receive the base of the rods 27. As previously mentioned, alternative locking means are illustrated in FIGURE 4. Screws 45 are tightened to compress gaps 48 against the spherical bearings. Plungers 46 are positioned in bores at opposite ends of block 47 to oppose the compressive force exerted by screws 45. The base of each plunger rides on a cam 40 which is mounted on shaft 41. In this manner, rotation of shaft 41 with wheel 39 will force plungers 46 against the outer wings of block 46 to release the compression on the bearings 26a, thereby freeing these bearings for movement. Continued or counter rotation will retract the plungers and lock the bearings in place. A cast connector 16 is shown mounted in the cast support. Screw 44 is tightened to secure the connector in this support. The opposite end of 16 is embedded in a plaster cast which is prepared with the frame shown in FIGURE 5.

Figure 5:
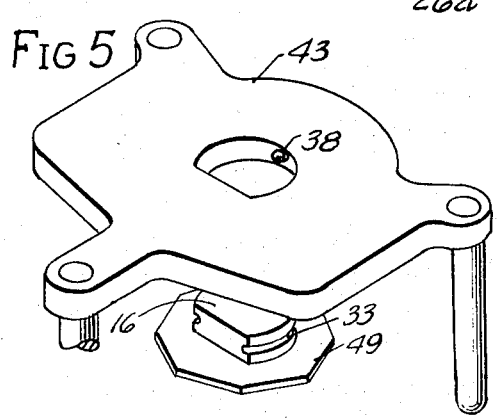
FIGURE 5 illustrates a frame used in the fabrication of casts to be mounted in the articulator.

Referring now to FIGURE 5, the casts are fabricated by placing a cast connector such as 16 in the seat of the table 43 of the tripod frame. The cast connector 16 is retained in this seat by spring biased pins 38 which seat into groove 33 around the shank of the connector 16. The base of the connector preferably has a flange 49 which is to be embedded in the plaster cast. The impression is placed directly beneath the cast connector and a cold setting plaster is mounted up to embed the flange 49. Preferably, the shape of table 43 is the conventional shape of a cast, as illustrated, so that the cast can be shaped by guiding a knife around the periphery of the table 43 to strike off excess plaster. After the plaster has hardened, the tripod is removed and the cast can be mounted in the articulator.

Referring now to FIGURE 6, the upper arm 23 of the conventional dental articulator is shown with a jig support pin 79 locked in the incisal pin bore by set screw 63. Because the clutch jig is placed between the models, the articulator is slightly open when the clutches are fabricated. Accordingly, the upper end of pin 79 is inclined about 6 degrees so that the remainder of the pin will be in a generally vertical position. A collar 65 with set screw 55 is preferably locked to support pin 79 to limit the centric closure of the casts such as 12 that are supported on the articulator. The base of the pin 79 can rest on the base of the articulator, but preferable the pin is offset as shown to clear the incisal table and rest on the work table surface.

A clamp that freely permits longitudinal and transverse angular disposition of the mounting jig is used to clamp a support arm 57 to pin 79. This clamp can be of conventional design comprising two blocks 58 and 59 that are bored to fit pin 79 and arm 57 respectively. A slot is cut in each block intersecting each bore as shown at 60 and 61; see FIGURE 7. A lock screw 62 fits through a bore in block 59 and the inside half of slotted block 58 to engage a threaded tap in the outer half of this block. After the jig has been aligned between the models of the teeth, tightening of screw 62 locks the jig in position by clamping slotted blocks 58 and 59 to pin 62 and arm 57. Arm 57 has a threaded end which is turned into the jig crosspiece 64 at its midpoint.

Attached, by suitable means such as screws or solder, to each end of crosspiece 64 are hollow side rods 66 and 67, each of which have a longitudinal slot 68 cut along their inside surface. A clutch separation plate 69 fits into the slots 68 of the side rods. This separation plate can be metal, plastic or rubber; preferably a flexible rubber is used. The edges of the plate are preferably slightly enlarged to a greater thickness than slots 68 to lock into the side rods.

An upper clutch fork 70 rests on top of the separation plate. A metal face plate 70a is attached to the front vertical face of fork 70 by suitable means such as self tapping screws. By means of this plate, the fork can be removably attached to the back of crosspiece 64 by screw 71 which engages a threaded tap in the center of plate 70a. An indexing means such as a key track in plate 64 and a matching key on the plate 70a is used to accurately position the clutch. A lower clutch fork 72 with its face plate 72a is positioned beneath the separation plate and locked by screw 73 to the crosspiece with a similar indexing means.

The aforementioned clutch support fork also forms a part of my invention. As illustrated, the forks are generally U-shaped with a bight and side arms attached thereto, all lying in a substantially flat plane. The bight has a flat anterior face to which the key means 70a can be affixed. The anterior face of the bight has means to orient the key in a fixed and predetermined relationship to the fork 70. In the illustration, this means comprises taps bored into the bight face at fixed positions to receive screws 70b.

The clutch forks can then be fabricated of an inexpensive material and disposed of with the clutches. Conventionally, dental forks are cast aluminum or other metal and must be recovered by breaking off the plastic casting. My forks, however, can be formed of less durable and inexpensive materials by use of a removable key that can be formed of the more expensive and stronger materials such as steel, aluminum, magnesium, nylon, etc. In this fashion, a strong joint can be made between the dental fork and the equipment, e.g., face bow crossbars while using inexpensive plastic for the fork which need not be recovered from the clutches.

Preferably, the forks are formed of plastics which present an adherent surface to the casting plastic. Commonly, acrylic resins are used in these castings and any of the following plastics can be used: polyethylene, polypropylene, polystyrene, polyvinylchloride, polymethyl methacrylate, cellulose nitrate, cellulose acetate, phenol-formaldehyde, phenol-furfural, urea-formaldehyde, melamine-formaldehyde, polyacrylonitrile, etc. Most of these plastics will soften when contacted by the acrylic casting plastic and thereby provide a very adherent bonding to the impression. The clutches formed on my plastic forks also can be trimed more than those formed on metal forks where interference with the metal side arms prevents paring of the clutch to a smaller dimension than that of the original fork.

It is generally desirable to align the mandibular clutch posteriorly of the maxillary clutch in accordance with the over-bite of the patient. Because the amount of the over-bite varies between patients, a universal jig preferably should have means permitting variation in the longitudinal positioning of the clutches. Such a means is illustrated by the keyed insert 74. Several inserts having thicknesses from about 1/8 to about 1/4 inch can be used for maximum flexibility and provide spacings from 1/8 to about 5/8 inch.

Conventionally, a dished bearing surface is centrally positioned in the maxillary clutch and this bearing surface is concavely oriented to the mandibular clutch. A bearing pin is mounted in the latter clutch to a support that separates the clutches. A similar construction can also be used in the clutches fabricated in my jig by resting the dished bearing plate on the separation plate 69. The preferred embodiment of my invention, however, molds a bearing surface into the underside of the upper clutch and such molded bearing surface has a shape that will discourage protrusive movement of a patient's jaw during lateral excursion when the clutches are attached to a writing device and used to obtain recordings of jaw movements. The particular shape of the separation plate is shown in cross-section in FIGURE 6; a detailed description thereof is deferred for the discussion in regard to FIGURE 7.

The bearing pin support to be cast into the lower clutch comprises a disk 78 which is attached to the underside of the separation plate 69 by pin 77. The support disk 78 can be made of any suitable material such as aluminum, plastic, rubber, etc. A bearing pin (not shown) is used to separate the clutches when they are used in the patient's mouth. This pin fits into the center bore of disk 78 which can be threaded to fit a threaded shank of the pin thereby permitting variation in the vertical disposition of the pin in the disk. The pin is of a length sufficient to engage the bearing surface in the underside of the upper clutch when the clutches are inserted in the patient's mouth. Preferably, the separation plate 69 has a lowered shelf on its underside such as 75. This shelf is generally trapezoidal in shape and centrally positioned in the anterior half of plate 69. The side walls of the trapezoidal shelf will confine the plastic when the lower clutch is molded thereby providing space for the patient's tongue.

In a preferred embodiment, the disk 78 is not used; instead, pin 77 is used with a threaded shank and is coated with a parting compound, e.g., a silicon. The shank thus serves as a die to mold a threaded tap in the plaster of the lower clutch.

A parting agent such as a film of a plastic or metal foil or a liquid which dries and provides an adhesive coating, e.g., a silicon in a volatile liquid solvent, is placed about the jig assembly when the clutches are cast. To attach a film to the mounting jig, several pins 87 are placed on the outer edge of tubes 66 and 67 and these pins are inserted through perforations in the film to hold it in place. The outer ends of the pins can be pointed if desired to avoid the necessity to perforate the film. Preferably the end of the pins is slightly enlarged to form a lip that prevents the accidental removal of the film.

FIGURE 7 illustrates the preferred shape of the upper surface of plate 69 which is used to mold a bearing surface in the upper clutch. The posterior central portion of the plate has a raised surface 76 which is trapezoidal in shape and employed to retain the plastic about the model of the teeth. The anterior portion of the raised surface has a central track formed from the two inclined surfaces 84 and 85. The inclination of 84 is about 16 degrees; that of 85 is about 35 degrees as shown in cross-section in FIGURE 6. Triangular shaped wings 82 are at each side of track 84 and these wings are inclined downwardly to the base or surface 69. Similarly shaped wings 81 are positioned at either side of track 85 and a flat plateau 83 is positioned at the posterior end of track 83. To facilitate the illustration, the wings and track are shown with sharp juncture lines. In practice, however, I prefer to blend these surfaces together with rounded edges that provide a smooth transition between the surfaces.

Figure 8:
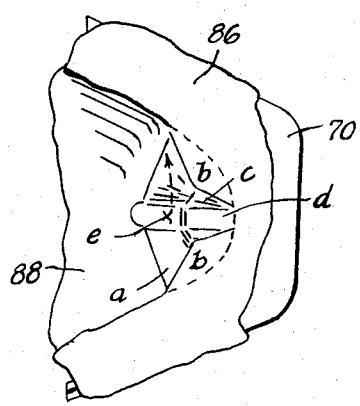
FIGURE 8 illustrates the bearing surface of a clutch fabricated according to my invention to limit the protrusive motion during lateral excursion of a jaw.

The underside of a clutch fabricated on the aforedescribed plate 69 is shown in FIGURE 8. This clutch is shown cast on fork 70 to have a U-shaped flat undersurface 86 with a concave center surface 88. The concave center surface can assume a variety of shapes provided that at any point on this surface (other than on the centerline) the angle of inclination of the sidewalls be greater in a longitudinal than in a lateral direction. Along the centerline, however, the angle of inclination is greater in a lateral than in a longitudinal direction. As illustrated, surfaces $b$ are generally flat triangular extensions of surface 86. Surfaces $d$ and $e$ form a track having an initial incline of about 16 degrees (surface $d$) and final incline of about 35 degrees (surface $e$). Surfaces $c$ define steep sidewalls on either side of track $d$ and surfaces $a$ form more shallow sidewalls on either side of track $e$. Point $x$ on track $e$ indicates the centric position of the center bearing pin when the clutches are in the patient's mouth. Upon lateral excursion, the dashed line indicates the path of the bearing pin which follows the path of least resistance. Any protrusive movement is discouraged by the pitch of surfaces $a$ which are steeply oriented against forward motion. The steepness of these surfaces is proprioceptively sensed by the patient and avoided, thereby avoiding forward movement during lateral excursion. Similarly, pure protrusive movement is assured by the steep inclines of surfaces $a$ and $c$ on either side of track $d$.

Figure 9:
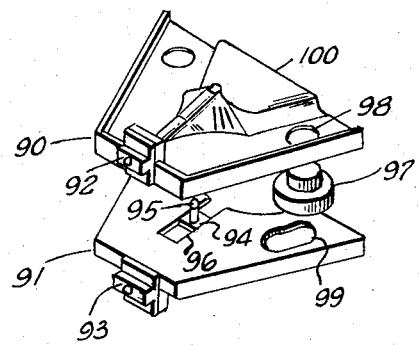
FIGURE 9 illustrates the jig for the direct fabrication of dental clutches in a patient's mouth.

FIGURE 9 shows an alternative clutch assembly. This assembly comprises wafers 90 and 91 with face plates 92 and 93 having key means to engage a key track on dental appliances.

The underside of the wafer 90 is preferably shaped similarly to the shape of the upper side of plate 69 shown in FIGURE 7, with the concave undersurface oriented towards the second wafer. A bearing pin 95 is threaded in a block 94 which is slidably mounted in the second wafer. The slot 96 in which the block 94 is mounted, is centrally located in the second wafer opposite the concave undersurface of wafer 90. While the wafers are illustrated separated from each other, in use, the wafers are sandwiched together with spacers 97 to insure the desired vertical separation. These spacers fit into matching depressions in the wafers, bore 98 in the first wafer and groove 99 in the second wafer. The groove in the second wafer permits the clutches to be used in different longitudinal positions. Preferably, the outer surfaces of the wafers have a raised lip about their edges to retain the plastic during molding of the clutches. A trapezoidal raised surface 100 on wafer 90 and a similar surface on the underside of 91 can be used to confine the plastic.

The aforementioned clutches are used with conventional face bows and panograph assemblies. To obtain a fixed position on the crossbows, a mounting block having a key track to fit the keys of clutches 70, 72, 90 or 91 is permanently affixed to the center of the crossbars of the facebows. In this manner, a positive and fixed angular disposition of the clutch to the crossbar, and hence, to the remainder of the facebow or panograph is achieved. A bore can be placed in the center of the mounting block and a screw such as 71 and 73 shown in FIGURE 6 can be used to engage a threaded tap in the face plate on the clutch to lock the latter to the crossbar.

The use of the aforementioned cast supports and clutch fabrication jig is apparent from the preceding discussion. The casts used to support the models in the articulator are fabricated separate from the articulator by use of the tripod shown in FIGURE 5. The casts are then locked into supports 14 and 15 and the lower cast is locked into a convenient working position. The upper cast is then guided into position on the lower cast and locked in this position by retracting plungers such as 46 of support 14 or by tightening screws 28 as shown in plate 18.

The clutches are fabricated from the casts mounted in the articulator by attaching the clutch forks and bearing pin support to the clutch fabrication jig and attaching the latter to the articulator with pin 79. The clamp supporting the jig is loosened and the jig is oriented to the proper position between the models. The clamp is then tightened, a cold curing plastic is poured around the clutch forks, covered with a plastic film and then the articulator is closed to centric to cast the clutches.

The wafer sandwich shown in FIGURE 9 is used by placing quantities of the cold curing plastic on the upper and beneath the lower wafer, surrounding the sandwich with a sheet of plastic film or metal foil as a parting agent and then placing the assembly in the patient's mouth while having the patient close to centric to form the clutch. In a modified method, the parting agent can be dispensed with by applying the plastic to the wafer and then permitting the plastic to partially set before placing the assembly in the patient's mouth. By waiting several minutes, the plastic can be obtained in a tackless state which is still moldable into the desired casting.

The preceding disclosure is intended to illustrate my invention and prescribe a mode of practice thereof. It is not intended that the disclosure be unduly limiting of my invention but that the invention is to be defined by the step or steps and their obvious equivalents and the elements and their obvious equivalents set forth in the following claims.

I claim:

1. A dental articulator having first and second cast supporting members adapted to support an upper and a lower dental cast of a patient's teeth by an upper and lower dental cast supports attached to each of said members, at least one of said cast supports comprising a first plate removably attached to one of said members, first and second sockets having concave walls in said plate at each end thereof, bearings in each of said sockets and mating with said concave walls, first and second rods extending through bores in said bearings, means to lock said bearings in said sockets, means to lock said rods in said bearings; a second plate having similarly disposed sockets and bearings, said rods also extending into the bearings of said second plate, means to lock said bearings in said second plate; and means to removably attach a dental cast to said second plate.

2. The articulator of claim 1 wherein said means to lock said bearings in said sockets comprises a slot cut into said plates and intersecting each of said bearings and means to compress said slot to bind said socket walls against said bearings.

3. The articulator of claim 2 wherein said bearings are segmented and adapted to bind against said rods when said socket walls are compressed.

4. The dental articulator of claim 1 wherein said second plate position can be varied to permit varied vertical positions of said dental cast.

5. The dental articulator of claim 1 wherein said second plate position can be varied to permit varied lateral and longitudinal positions of said cast.

6. The dental articulator of claim 1 wherein said second plate position can be varied to permit universal variation in the position of said cast.

References Cited

UNITED STATES PATENTS

| | | | |
|---|---|---|---|
| 750,203 | 1/1904 | Knight | 32—32 |
| 1,080,809 | 12/1913 | Burch | 32—20 |
| 2,239,294 | 4/1941 | Opotow | 32—19 |
| 2,613,440 | 10/1952 | Murray et al. | 32—32 |
| 2,644,233 | 7/1953 | Shmukler et al. | 32—32 |
| 2,801,470 | 8/1957 | Logan et al. | 32—32 |
| 2,829,435 | 4/1958 | Kazis et al. | 32—19 |
| 3,159,914 | 12/1964 | De Pietro | 32—20 |

RICHARD A. GAUDET, *Primary Examiner.*

J. W. HINEY, *Assistant Examiner.*